United States Patent
Sitaram Amritphale et al.

(10) Patent No.: US 10,214,453 B2
(45) Date of Patent: Feb. 26, 2019

(54) ADVANCED CEMENT FREE COMPOSITION FOR CONCRETE AND PANELS AND METHOD OF PREPARATION THEREOF

(71) Applicant: Council of Scientific & Industrial Research, New Delhi, Delhi (IN)

(72) Inventors: Sudhir Sitaram Amritphale, Madhya Pradesh (IN); Sarika Verma, Madhya Pradesh (IN); Mohammed Akram Khan, Madhya Pradesh (IN); Prabha Padmakaran, Madhya Pradesh (IN); Avneesh Anshul, Madhya Pradesh (IN); Satyabrata Das, Madhya Pradesh (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 0 days.

(21) Appl. No.: 15/717,422

(22) Filed: Sep. 27, 2017

(65) Prior Publication Data
US 2018/0093922 A1 Apr. 5, 2018

(30) Foreign Application Priority Data

Oct. 5, 2016 (IN) .............................. 201611034060

(51) Int. Cl.
| | |
|---|---|
| *C04B 14/06* | (2006.01) |
| *C04B 18/08* | (2006.01) |
| *C04B 28/26* | (2006.01) |
| *C04B 40/00* | (2006.01) |
| *C04B 22/06* | (2006.01) |
| *C04B 111/26* | (2006.01) |
| *C04B 111/10* | (2006.01) |

(52) U.S. Cl.
CPC ............ *C04B 28/26* (2013.01); *C04B 14/068* (2013.01); *C04B 22/062* (2013.01); *C04B 40/0042* (2013.01); *C04B 2111/1037* (2013.01); *C04B 2111/26* (2013.01)

(58) Field of Classification Search
CPC ....... C04B 28/26; C04B 14/06; C04B 14/068; C04B 22/0026; C04B 22/062; C04B 18/08; C04B 2111/26; C04B 2111/1037
See application file for complete search history.

(56) References Cited

U.S. PATENT DOCUMENTS

| | | | | |
|---|---|---|---|---|
| 8,562,736 | B2* | 10/2013 | Gill | .................. C04B 28/02 |
| | | | | 106/724 |
| 9,266,783 | B2* | 2/2016 | Sitaram | ............... C04B 40/0042 |
| 9,604,880 | B2* | 3/2017 | Allouche | .............. C04B 28/006 |
| 9,902,650 | B2* | 2/2018 | Guerini | ................... C04B 24/06 |
| 2007/0125272 | A1* | 6/2007 | Johnson | ............... C04B 28/006 |
| | | | | 106/638 |
| 2014/0202358 | A1 | 7/2014 | Aoki et al. | |
| 2014/0238273 | A1* | 8/2014 | Sagoe-Crentsil | ..... C04B 28/006 |
| | | | | 106/624 |
| 2016/0340252 | A1* | 11/2016 | Kumar | ................... C04B 28/006 |
| 2017/0144933 | A1* | 5/2017 | Allouche | .............. C04B 28/006 |
| 2017/0204008 | A1* | 7/2017 | Willis | ................... C04B 18/021 |

FOREIGN PATENT DOCUMENTS

| | | | |
|---|---|---|---|
| CN | 106032313 A | * | 10/2016 |
| CN | 106336158 A | * | 1/2017 |
| EP | 2465837 A1 | | 6/2012 |
| JP | 06-239655 A | * | 8/1994 |

OTHER PUBLICATIONS

Zaher Kuhail et al., Permeability and chloride penetration of concrete subjected to Gaza sea water exposure, Journal of Islamic University of Gaza, vol. 19, pp. 67-84, Feb. 2001.
Keisaburo Katano et al., Properties and application of concrete made with sea water and unwashed sea sand, 3rd International conference on sustainable constructions materials & technology http://www.claisse.info/Proceedings.htm.
Making concrete from sand and sea water, Talk Vietnam, www.talkvietnam.cocm/2012/.../making-concrete-from-sand-and-seawater, [2012].
Guoliang Zhang, Study on the properties of sea sand concrete, Mechanic Automation and control Engineering (MACE) 2011.
M.W. Tjarongeetal, Influence of the curing method on compresive strength and porosity of concrete mixed with sea water, marine sand and fly ash, 7th International Conference on Asian and Pacific Coasts (APAC), Indonesia, 2013.

* cited by examiner

*Primary Examiner* — Anthony J Green
(74) *Attorney, Agent, or Firm* — Katten Muchin Rosenman LLP

(57) ABSTRACT

The present invention relates to advanced cement free composition for concrete and panels useful in construction industry and the method of preparation thereof. Particularly the present invention relates to advanced cement free composition constituting Sea sand, Fly Ash, Seawater, NaOH and $Na_2SiO_3$ (sodium meta silicate). More particularly the present invention relates to advanced cement free composition for concrete and panels with comprehensive strength of 15 to 30 MPa and flexural strength of 1.5-3.0 MPa.

6 Claims, No Drawings

ADVANCED CEMENT FREE COMPOSITION FOR CONCRETE AND PANELS AND METHOD OF PREPARATION THEREOF

CROSS-REFERENCE TO RELATED APPLICATIONS

This application claims priority to India Application No.: 201611034060, filed Oct. 5, 2016, which is pending and which is hereby incorporated by reference in its entirety for all purposes.

FIELD OF THE INVENTION

The present invention relates to advanced cement free composition for concrete and panels useful in construction industry and the method of preparation thereof. Particularly the present invention relates to advanced cement free composition constituting Sea sand, Fly Ash, Seawater, NaOH and $Na_2SiO_3$ (sodium meta silicate). More particularly the present invention relates to advanced cement free composition for concrete and panels with compressive strength of 15 to 30 MPa and flexural strength of 1.5-3.0 MPa.

BACKGROUND OF THE INVENTION

The nearby areas of sea shore all over the world are facing acute shortage of land and also suffer from the erosion of sea shores. Further, the availability of fresh water and fine sand for construction activity is getting scarce in coastal areas and are to be transported from far away areas. Sea sand and sea water cannot be used for making conventional concrete due to the presence of alkaline and chloride contents. The conventional inorganic cementations cement free materials namely geo-polymeric material has emerged as an appropriate material for making cement free concrete using sea water and sea sand due their unique salt and chloride resistant properties, as otherwise these are the challenging factors in utilization of sea water and sea sand for making conventional concrete. Sea water due to high chloride content creates honey combing of structures and leads to corrosion of reinforcement in conventional cement concrete.

Geo-polymer concrete uses fly ash, a by-product created from the burning of coal. Currently, the majority of fly ash is dumped into landfills, causing environmental problems. The production of geo-polymer concrete allows fly ash to be utilized in bulk quantity. Geo-polymer concrete is also more resistant to structural damage than conventional concrete. It is also more resistant to salts, acids, seawater corrosion and fire. Therefore there is a need to develop cementations material readily and safely by utilizing sea water and sea sand. This will not only revolutionize the construction industry near the sea shores but will also make available costly land and overcome the erosion problem also.

Worldwide coastal line has vast availability of sea sand and sea water which is unutilized presently and is not suitable for any construction activity. The coastal sand being rich in high chloride and sulphate content is unfit for use as a fine aggregate in conventional cement concrete applications. The exploitation and use of river sand as fine aggregate in cement concrete has started creating an ecological and environmental imbalance and the issue of over exploitation of river sand for construction activities all over the word. It has therefore become imperative to look for an economically and technically viable option wherein the fine aggregate can be suitably replaced with coastal sand available in large quantity in world and its limitations are best used to the full advantage in making advanced geo-polymeric concrete material for various structural and non-structural applications. There is a strong potential of exploring and utilizing sea water and sea sand in the world for structural and non-structural applications.

Reference may be made to Article "Possibility of sea water as mixing water in concrete, by Nobuaki Otsukietal. August 2011 wherein the concrete utilizing sea water has been reported by using blast furnace slag and externally added corrosion inhibitor and ammonium citrate is used as anti-rusting agent. The drawbacks of the process are a) utilizes blast furnace slag is available in limited quantity as compare to fly ash b) requirement of externally added corrosion inhibitor and ammonium citrate as anti-rusting agent.

Reference may be made to article Research on using sea sand to produce cement concrete for road pavement construction by Tran Tuanhiep, science journal of transportation, Especial Issue No. 02 International cooperation Journals MADI—SWJTU, pp 8-14,2010 wherein cement concrete using sea sand and conventional cement has been reported. The drawbacks of the process are a) strength is less than traditional cement concrete. b) requirement of externally added corrosion inhibitor and ammonium citrate as anti-rusting agent.

Reference may be made to patent by Permeability and chloride penetration of concrete subjected to Gaza sea water exposure by Zaher Kuhail et al. Journal of Islamic University of Gaza vol.19, pp. 67-84-39, February 2001, wherein concrete using Gaza sea water has been reported. The drawback of this process is associated with the conventional cement concrete system.

Reference may be made to article "Study on the properties of sea sand concrete" by in Mechanic Automation and control Engineering (MACE), 2011 wherein sea sand concrete has been developed using fly ash and conventional concrete system. The drawback of this process is associated with the conventional cement concrete system.

Reference may be made to article "Durability of sea-sand containing concrete: Effects of chloride ion penetration by Yin Huiguang et al. in Mining Science and technology by vol.21, issue 1, pp. 123-127, January wherein sea sand containing concrete has been reported using conventional cement concrete system. The drawback of this process is associated with the conventional cement concrete system.

Reference may be made to Properties and application of concrete made with sea water and unwashed sea sand by Keisaburo Katano et al. In $3^{rd}$ International conference on sustainable construction materials & technology http://www.claisse.info/Proceedings.htm wherein concrete has been developed using blast furnace slag, silicafume, fly ash and special admixture containing calcium nitrate. The drawbacks of the process are externally used silica fumes and calcium nitrate.

Reference may be made to article Making concrete from sand and sea water—Talk Vietnam in www.talkvietnam.com/2012/. . ./making-concrete-from-sand-and-sea-water wherein concrete from sea sand and sea water has been developed. The drawback of the process is the need of external additives.

Reference may be made to patent Sea water-mixed concrete, concrete structure constructed with the same and design method of concrete structure constructed with sea water mixed concrete by Shigeru Aoki et. al. USPTO Publication no. 2014/02 02 358 A1, March 2014 wherein concrete has been developed using sea sand sea water using slag containing cement and nitrite based admixtures and pozzolan. The drawback are externally used nitrite based admixtures and pozzolan.

Reference may be made to Thesis "Investigation of abundant treated sea sand in cement brick with the ration of 1:6 with different percentages" by Khairul Danial Bin Abd. Latif, university Malaysia Pahang, December 2010 wherein treated sea sand has been used for making cement brick. The drawback of the process is cumbersome and requires treatment of sand before using.

Reference may be made to article "Study on the properties of sea sand concrete" by Guoliang Zhang in Mechanic Automation and control Engineering (MACE) 2011 wherein concrete has been developed using sea sand concrete with fly ash. The drawback of this process is associated with the conventional cement concrete system.

Reference may be made to Article "Influence of the curing method on compressive strength and porosity of concrete mixed with sea water, marine sand and fly ash" by M. W. Tjarongeetal. in Proceedings of the $7^{th}$ International Conference on Asian and Pacific Coasts (APAC), Indonesia, 2013 wherein concrete mixed has been reported using sea water, marine sand and fly ash. The drawback of this process is associated with the conventional cement concrete system.

Reference may be made to article "Thach Anh Transfers sea water-proof concrete technology to navy, PANO, 15 Mar. 2012 Wherein concrete from gravel, sea sand, seawater, cement and additives. The drawback of this process is associated with the conventional cement concrete system.

From the hitherto reported prior art and based on the drawbacks of the known processes, the various issues that need to be addressed and problems to be solved are summarized here as under. The last decades have witnessed significant achievements in the area of construction materials utilizing sea sand and sea water. However, the development of these construction materials suffers from the following drawbacks like the sea sand cannot be used for making conventional concrete without washing for removing salt content, the sea water cannot be used for making conventional concrete, the washing of sea sand uses fresh water which is a precious commodity in the vicinity of coastal areas. The use of unwashed sea sand in conventional concrete deteriorates its properties and leads to the corrosion of reinforcement of the concrete materials therefore there is a need to use epoxy coating, additives and anti-rusting agent externally on their reinforcement on utilization of sea sand and sea water in making conventional concrete.

OBJECTS OF THE INVENTION

The main object of the present invention is to provide advanced cement free composition for concrete and panels and method for preparation thereof.

Another object of the present invention is, to utilize the sea sand without the need of washing for removing salt content for making advanced cement free concrete and panels.

Still another object of the present invention is the utilization of sea water for making advanced cement free concrete and panels by novel process.

Yet another object of the present invention is to obviating the use of fresh water for making advanced cement free concrete and panels.

Still another object of the present invention is to develop advanced cement free concrete and panels by process wherein the use of unwashed sea sand does not deteriorates the properties of developed materials.

Still another object of the present invention is to improve corrosion of reinforcement of the advanced cement free concrete and panels using fly ash and thus obviating the need of externally used epoxy resin, additives and anti-rusting agent.

SUMMARY OF THE INVENTION

Accordingly the present invention provides a cement free composition for concrete cubes and panels comprising; 40-50 w % sea sand; 15-20 w % sea water; 8-12 w % Sodium hydroxide; 4-10 w % Sodium meta silicate and 15-21 w % fly ash, with compressive strength in the range of 1.5-30 MPa.

In an embodiment, the present invention provides a method of preparation of advanced cement free composition for concrete and panels, comprising the steps of:
a) mixing sea sand in the range of 40-50 w %, fly ash in the range of 15-21 w %, sodium hydroxide in the range of 8-12 w % and sodium meta silicate in the range of 4-10 w % to obtain a mixture;
b) dry grinding the mixture as obtained in step (a) for a period in the range of 20-24 hours and adding sea water in the range of 15-20 w % to obtain an advanced cement free composition.

In another embodiment, the present invention the use of sodium meta silicate in step (a) is optional.

In still another embodiment, the present invention provides for concrete cubes of dimensions 15 cm×15 cm×15 cm and cured at temperature of 28° C. for the duration of 3-28 days and further heat cured at the temperature in the range of 50-60° C. for a duration in the range of 24-72 hours.

In still another embodiment, the present invention provides for reinforced panels of dimensions 1 feet×1 feet×20 mm and 2 feet×2 feet×20 mm by using wire mesh of 1 feet×1 feet×2 mm and 2 feet×2 feet×2 mm at a compacting pressure in the range of 10-50 kg/cm$^2$, and are heat cured at the temperature of 40 to 80° C. for a duration of 24 to 72 hours.

In still another embodiment of present invention, the compressive strength of the concrete cubes is in the range of 15-30 MPa when cured for 3-28 days.

In still another embodiment of present invention, the flexural strength of the reinforced panels is in the range of 1.5-3.0 MPa (Megapascals)

DETAILED DESCRIPTION OF THE INVENTION

The present invention describes a cement free composition for concrete cubes and panels comprising; sea sand; sea water; Sodium hydroxide; Sodium meta silicate and fly ash and a process for making cement free concrete and panels by utilizing sea sand and sea water. The process involving mechano-chemical reaction involving simultaneous and synergistic reactions among the mineralogical phases of sea sand and fly ash with alkali leading to the in-situ synthesis of cementations materials possessing anti-rusting, additives and corrosion resistance characteristics useful for making advanced cement free concrete and panels with and without reinforcement.

Further, process essentially involves the introduction of new era of making "advanced cement free concrete and panels" by utilizing sea sand and sea water by a novel process.

The process involves utilizing the sea sand as such i.e without the need of washing for removing salt content for making advanced cement free concrete and panels by novel process. The process involves the utilization of sea water as such for making advanced cement free concrete and panels by novel process. It obviates the use of fresh water which is to be brought from the distant places and thus saving on cost of making advanced cement free concrete and panels by novel process. It involves to develop advanced cement free concrete and panels by novel process wherein the use of unwashed sea sand does not deteriorates the properties of developed materials. The process involves improving corrosion of reinforcement of the advanced cement free concrete and panels by novel process which provides inherently corrosion resistant coating using a waste namely fly ash and thus obviating the need of externally used epoxy resin, additives and anti-rusting agent. The process involves control erosion of sea shores by converting sea sand in to advanced cement free concrete by novel process and thus enabling the availability of land on sea shore i.e Back Bay reclamation of sea shores.

The use of "advanced cement free concrete and panels" utilizing sea sand and sea water, lies in the area of construction industry.

The present invention provides A novel process for making advanced cement free concrete and panels by utilizing "sea sand and sea water" which comprises together dry grinding of 400 g to 700 g of fly ash, 1200 g to 2100 g sea sand, 200 g to 400 g of sodium hydroxide and without and with 100 g to 200 g of sodium meta silicate for 8 to 24 hours, to which 400 ml to 800 ml sea water was added to form advanced cement free cementatious materials which was further used for making standard cement free concrete cubes of dimensions 15 cm×15 cm×15 cm using standard methods and cured at ambient temperature for the duration of 3, 7, 14 and 28 days and were heat cured in the temperature range of 40 to 80° C. for a duration of 24 to 72 hours and were tested for compressive strength as per ISI and reinforced panels of dimensions 1 feet×1 feet×20 mm and 2 feet×2 feet×20 mm are being made by using wire mesh of 1 feet×1 feet×2 mm and 2 feet×2 feet×2 mm at a compacting pressure in the range of 10-50 kg/cm$^2$ and will be heat cured in the temperature range of 40 to 80° C. for a duration of 24 to 72 hours and will be tested for flexural strength as per ISI.

A novel process in together dry grinding of 400 g to 700 g of fly ash, 1200 g to 2100 g sea sand, 200 g to 400 g of sodium hydroxide and without and with 100 g to 200 g of sodium meta silicate for 8 to 24 hours takes place, in which 400 ml to 800 ml sea water was added to form advanced cement free cementations materials.

The advanced cement free cementations material was used for making standard cement free concrete cubes of dimensions 15 cm×15 cm×15 cm using standard methods, the standard cement free concrete cubes were cured at ambient temperature for the duration of 3, 7, 14 and 28 days and were heat cured in the temperature range of 40 to 80° C. for duration of 24 to 72 hours. Standard cement free concrete cubes were tested for compressive strength and the compressive strength of the concrete cubes was in the range of 15-30 MPa when cured for 3-8 days.

The reinforced panels of dimensions 1 feet×1 feet×20 mm and 2 feet×2 feet×20 mm are being made by using wire mesh of 1 feet×1 feet×2 mm and 2 feet×2 feet×2 mm at a compacting pressure in the range of 10-50 kg/cm$^2$, the reinforced panels will be heat cured in the temperature range of 40 to 80° C. for duration of 24 to 72 hours and will be tested for flexural strength as per ISI, the flexural strength of the reinforced panels is in the range of 1.5-3.0 MPa.

The involves in-situ synthesis of corrosion resistant and anti coating cementations material using a waste namely fly ash and thus obviating the need of externally used epoxy resin and anti-rusting agent.

EXAMPLES

Following examples are given by way of illustration and therefore should not be construed to limit the scope of the invention.

Example 1

For making advanced cement free composition the Puri Sea Sand and Sea Water were used. The process involved dry grinding 16.7% fly ash, 50% sea sand, 9.52% sodium hydroxide and 4.8% of sodium meta silicate for 24 hours, to which 19.1% sea water was added to form advanced cement free cementatious materials which was further used for making standard cement free concrete cubes of dimensions 15 cm×15 cm×15 cm using standard methods and cured at temperature of 28° C. for the duration of 7 and 28 days. These cubes were further heat cured at the temperature of 60° C. for a duration of 24 hours and were tested for compressive strength as per ISI and the compressive strength was found to be about 23 MPa in 7 days and about 30 MPa in 28 days.

Example 2

For making advanced cement free composition the Mumbai Sea Sand and Sea Water, were used. The process involved dry grinding of 16.7% fly ash, 50% sea sand, 9.52% sodium hydroxide and 4.8% of sodium meta silicate for 24 hours, to which 19.1% sea water was added to form advanced cement free cementations materials which was further used for making standard cement free concrete cubes of dimensions 15 cm×15 cm×15 cm using standard methods and cured at temperature of 28° C. for the duration of 7 and 28 days and were heat cured at the temperature of 60° C. for a duration of 24 hours and were tested for compressive strength as per ISI and the compressive strength was found to be about 17 MPa in 7 days and about 22 MPa in 28 days.

Example 3

For making advanced cement free composition the Puri Sea Sand and Sea Water were used. The process involved dry grinding of 17.4% fly ash, 52.17% sea sand, 8.7% sodium hydroxide and 4.34% of sodium meta silicate for 24 hours, to which 17.40% sea water was added to form advanced cement free cementations materials which was further used for making standard cement free concrete cubes of dimensions 15 cm×15 cm×15 cm using standard methods and cured at 28° C. for the duration of 3 and 14 days and were heat cured at the temperature of 50° C. for a duration of 72 hours and were tested for compressive strength as per ISI and the compressive strength was found to be about 20 MPa in 3 days and about 26 MPa in 14 days.

Example 4

For making advanced cement free composition the Mumbai Sea Sand and Sea Water were used. The process involved dry grinding of 17.4% fly ash, 52.17% sea sand, 8.7% sodium hydroxide and 4.34% of sodium meta silicate for 24 hours, to which 17.40% sea water was added to form advanced cement free cementatious materials which was further used for making standard cement free concrete cubes of dimensions 15 cm×15 cm×15 cm using standard methods and cured at 28° C. for the duration of 3 and 14 days and were heat cured at the temperature of 50° C. for a duration of 72 hours and were tested for compressive strength as per ISI and the compressive strength was found to be about 15 MPa in 3 days and about 20 MPa in 14 days.

Example 5

For making advanced cement free composition the Puri Sea Sand and Sea Water were used. The process involved dry grinding of 18.46% fly ash, 49.23% sea sand, 9.23% sodium hydroxide and 4.61% of sodium meta silicate for 24 hours, to which 18.46% sea water was added to form advanced cement free cementations materials which was further used for making standard reinforced panels of dimensions 1 feet×1 feet×20 mm made by using wire mesh of 1 feet×1 feet×2 mm at a compacting pressure of 40 kg/cm$^2$ and was heat cured in the temperature 60° C. for a duration of 48 hours and was tested for flexural strength as per ISI and the flexural strength was found to be about 3.0 MPa in14 days.

Example 6

For making advanced cement free composition the Mumbai Sea Sand and Sea Water were used. The process involved dry grinding of 20.19% fly ash, 46.6% sea sand, 11.1% sodium hydroxide and 5.27% of sodium meta silicate for 24 hours, to which 17.08% sea water was added to form advanced cement free cementations materials which was further used for making standard reinforced panels of dimensions 2 feet×2 feet×20 mm made by using wire mesh of 2 feet×2 feet×2 mm at a compacting pressure of 50 kg/cm$^2$ and was heat cured in the temperature 80° C. for a duration of 48 hours and was tested for flexural strength as per ISI and the flexural strength was found to be about 1.5 MPa in 14 days.

Advantages of the Invention

The main advantages of the present invention are:
1) The main advantage of present invention is it utilizes fly ash, sea sand, sodium hydroxide with or without sodium meta silicate for obtaining cement free cementations material which on just adding sea water alone is useful for making advanced cement free concrete and panels.
2) The present invention uses sea sand as such i.e without washing by fresh water for removing salt content for making advanced cement free concrete and panels by process.
3) Another advantage of the process is the use of unwashed sea sand does not deteriorates the properties of developed materials.
4) Another advantage of the process provide inherently corrosion resistant coating, additives and anti-rusting agent using a waste namely fly ash and thus obviating the need of externally used epoxy resin and anti-rusting agent.

The invention claimed is:

1. A cement free composition useful for preparation of concrete cubes and panels comprising; 40-50 w % sea sand; 15-20 w % sea water; 8-12 w % Sodium hydroxide; 4-10 w % Sodium meta silicate and 15-21w % Fly ash.

2. A method of preparation of cement free composition for concrete and panels as claimed in claim 1, comprising the steps of:
   a) mixing sea sand in the range of 40-50 w %, fly ash in the range of 15-21 w %, sodium hydroxide in the range of 8-12 w % and sodium meta silicate in the range of 4-10 w % to obtain a mixture;
   b) dry grinding the mixture as obtained in step (a) for a period in the range of 20-24 hours and adding sea water in the range of 15-20 w % to obtain an advanced cement free composition.

3. The cement free composition as claimed in claim 1, wherein concrete cubes are prepared from said composition having dimensions of 15 cm×15 cm×15 cm and cured at a temperature of 28° C. for a duration in a range of 3-28 days and further heat cured at a temperature in a range of 50-60° C. for a duration in a range of 24-72 hours.

4. The cement free composition as claimed in claim 1, wherein panels are prepared from the said composition having dimensions of 1 feet×1 feet×20 mm and 2 feet×2 feet×20 mm by using wire mesh of 1 feet×1 feet×2 mm and 2 feet×2 feet×2 mm at a compacting pressure in the range of 10-50 kg/cm$^2$, and are heat cured at the temperature in the range of 40 to 80° C. for a duration of 24 to 72 hours.

5. The cement free composition as claimed in claim 1, wherein concrete cubes are prepared from the cement free composition having a compressive strength in the range of 15-30 MPa, when cured for 3-28 days.

6. The cement free composition as claimed in claim 1, wherein panels are prepared from the cement free composition having a flexural strength in the range of 1.5-3.0 MPa (Megapascals).

* * * * *